US012407129B2

(12) United States Patent
Li et al.

(10) Patent No.: US 12,407,129 B2
(45) Date of Patent: Sep. 2, 2025

(54) ELECTRICAL RECEPTACLE CONNECTOR

(71) Applicant: ADVANCED-CONNECTEK INC., New Taipei (TW)

(72) Inventors: Yu-Bin Li, New Taipei (TW); Guan Liao, New Taipei (TW); Shu-Fen Wang, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 288 days.

(21) Appl. No.: 18/362,583

(22) Filed: Jul. 31, 2023

(65) Prior Publication Data

US 2024/0039205 A1 Feb. 1, 2024

(30) Foreign Application Priority Data

Aug. 1, 2022 (CN) ......................... 202222007441.7

(51) Int. Cl.
*H01R 13/52* (2006.01)
*H01R 13/6585* (2011.01)

(52) U.S. Cl.
CPC ..... *H01R 13/5202* (2013.01); *H01R 13/6585* (2013.01)

(58) Field of Classification Search
CPC . H01R 13/5202; H01R 13/6585; H01R 43/24
USPC ........................................ 439/589, 606, 936
See application file for complete search history.

(56) References Cited

U.S. PATENT DOCUMENTS

| | | | | |
|---|---|---|---|---|
| 3,970,352 A * | 7/1976 | Dorrell | H01R 13/424 | 439/589 |
| 4,266,844 A * | 5/1981 | Chelminski | H01R 13/523 | 439/453 |
| 5,618,202 A * | 4/1997 | Okuyama | H01R 12/775 | 439/497 |
| 7,014,478 B2 * | 3/2006 | Yamashita | B60R 16/0238 | 439/949 |
| 8,187,016 B2 * | 5/2012 | Vijh | H01R 13/5205 | 439/271 |

* cited by examiner

*Primary Examiner* — Gary F Paumen
(74) *Attorney, Agent, or Firm* — Muncy, Geissler, Olds & Lowe, P.C.

(57) ABSTRACT

An electrical receptacle connector includes an insulated housing, a plurality of receptacle terminals, and a metallic shell. A hollow portion is between a base portion and a tongue portion of the insulated housing, and body portions of the receptacle terminals penetrate through the base portion and the tongue portion and are partially exposed from the hollow portion. The metallic shell covers the insulated housing and covers the hollow portion to form a potting space at the hollow portion. The metallic shell has a potting opening corresponding to the potting space. When a sealing body is poured into the potting opening, the sealing body is provided between the insulated housing and the receptacle terminals. Hence, the waterproof function of the electrical receptacle connector can be achieved.

20 Claims, 8 Drawing Sheets

ELECTRICAL RECEPTACLE CONNECTOR

CROSS-REFERENCE TO RELATED APPLICATION

This non-provisional application claims priority under 35 U.S.C. § 119(a) to Patent Application No. 202222007441.7 filed in China, P.R.C. on Aug. 1, 2022, the entire contents of which are hereby incorporated by reference.

FIELD OF THE INVENTION

The instant disclosure relates to an electrical connector, and more particular to an electrical receptacle connector.

BACKGROUND

There are various transmission interfaces for the connectors; for example, HDMI transmission interface and Universal Serial Bus (USB) interface. Generally, the Universal Serial Bus (USB) is a serial bus standard to the PC architecture with a focus on computer interface, consumer electronics and productivity applications. The existing Universal Serial Bus (USB) interconnects have the features of plug-and-play and user-friendliness. As technology innovation advances, new types of devices, media formats and large inexpensive storage are converging. Theses changes require significantly more bus bandwidth to maintain the interactive experience that users have come to expect. Moreover, there is a growing demand for a higher performance between PCs and sophisticated peripherals. The transmission rate of USB 2.0 is insufficient. As a consequence, faster serial bus interfaces such as USB 3.0, have been developed to provide higher transmission rates and meet the need of a variety devices.

SUMMARY OF THE INVENTION

The appearance, the structure, the contact ways of terminals, the number of terminals, the pitches between terminals (the distances between the terminals), and the pin assignment of terminals of a USB type-C electrical connector known to the inventor(s) are totally different from those of a USB electrical connector known to the inventor(s). A USB type-C electrical receptacle connector known to the inventor includes flat terminals on the plastic housing, and the plastic housing is covered by a metal shell. In the USB type-C electrical receptacle connector, waterproof glues are applied at the end portion of plastic housing to achieve the waterproof function of the plastic housing and the metal shell. However, in such configuration, the moisture can still enter the interior of the electrical connector through the gaps between the plastic housing and the flat terminals. Especially, after the electrical connector is heated by passing through the convection oven, because of the thermal expansion of the components of the electrical connector, gaps are generated between the plastic housing and the flat terminals, thereby causing the failure of the waterproof function of the electrical connector.

According to one or some embodiments, an electrical receptacle connector is provided. The electrical receptacle connector comprises an insulated housing, a plurality of receptacle terminals, and a metallic shell. The insulated housing comprises a base portion, a tongue portion, and a hollow portion. The tongue portion is at a front end of insulated housing, the base portion is at a rear end of the insulated housing, and the hollow portion is between the base portion and tongue portion. The receptacle terminals are held at the base portion and the tongue portion. Each of the receptacle terminals comprises a contact portion, a body portion, and a tail portion. Each of the contact portions extends from one of two ends of a corresponding one of the body portions and the contact portions are on two faces of the tongue portion, each of the tail portions extends from the other end of the corresponding one of the body portions and protrudes out of the base portion, and the body portions penetrate through the base portion and the tongue portion and are partially exposed from the hollow portion. The metallic shell has a receiving cavity and an insertion opening in communication with the receiving cavity. The insulated housing is in the receiving cavity, the metallic shell covers the hollow portion to form a potting space at the hollow portion, and the metallic shell has a potting opening corresponding to the potting space.

In some embodiments, the electrical receptacle connector further comprises a sealing body, the sealing body is in the potting space to fill the hollow portion, and the sealing body encloses the body portions at the hollow portion.

In some embodiments, the metallic shell comprises an inner shell and an outer shell combined with the inner shell, a buckling portion is on each of two sides of the base portion, and an engaging portion is on each of two sides of the outer shell; each of the engaging portions is engaged with a corresponding one of the buckling portions, the outer shell has the potting opening, the inner shell has an opening, and the opening corresponds to the potting opening.

In some embodiments, the receptacle terminals comprise a first row of terminals and a second row of terminals arranged into two rows; the tongue portion and the base portion are separated components; the tongue portion has a first tongue housing combined with the first row of terminals, a second tongue housing combined with the second row of terminals, and a third tongue housing combined with the first tongue housing and the second tongue housing; the base portion has a first base housing combined with the first row of terminals, a second base housing combined with the second row of terminals, and a third base housing combined with the first base housing and the second base housing.

In some embodiments, the third tongue housing has a tongue annular protruding portion, the third base housing has a base annular protruding portion, the base annular protruding portion contacts an inner wall of the inner shell, and the potting space is between the tongue annular protruding portion and the base annular protruding portion; the tongue portion has a stepped portion adjacent to the base portion, and the tongue annular protruding portion is at the stepped portion.

In some embodiments, the electrical receptacle connector further comprises a blocking member, the blocking member is fitted over the third tongue housing, the tongue annular protruding portion contacts an inner wall of the blocking member, an outer wall of the blocking member contacts the inner wall of the inner shell, and a side surface of the blocking member is in the receiving cavity and faces the insertion opening.

In some embodiments, the first base housing has an inclined portion corresponding to the potting opening.

In some embodiments, the electrical receptacle connector further comprises a waterproof gasket, and the waterproof gasket is fitted over the metallic shell and adjacent to the insertion opening.

In some embodiments, the electrical receptacle connector further comprises a fixing member combined with an outer portion of the metallic shell and adjacent to the insertion opening, the fixing member has a curved groove, and the waterproof gasket is in the curved groove.

In some embodiments, the electrical receptacle connector further comprises a grounding sheet, and the grounding sheet is at the insulated housing and between the receptacle terminals which are arranged into the two rows.

According to one or some embodiments, an electrical receptacle connector is provided. The electrical receptacle connector comprises an insulated housing, a plurality of receptacle terminals, and a metallic shell. The insulated housing comprises a base portion, a tongue portion, and a hollow portion. The tongue portion is at a front end of the insulated housing, the base portion is at a rear end of the insulated housing, and the hollow portion is between the base portion and the tongue portion. The receptacle terminals are held at the base portion and the tongue portion. Each of the receptacle terminals comprises a contact portion, a body portion, and a tail portion. Each of the contact portions extend from one of two ends of a corresponding one of the body portions and the contact portions are on two faces of the tongue portion. Each of the tail portions extends from the other end of the corresponding one of the body portions and protrudes out of the base portion, and the body portions penetrate through the base portion and the tongue portion and are partially exposed from the hollow portion. The metallic shell has a receiving cavity and an insertion opening in communication with the receiving cavity. The insulated housing is in the receiving cavity. The metallic shell comprises an inner shell and an outer shell combined with the inner shell, the inner shell covers the hollow portion to form a potting space at the hollow portion. The inner shell has an opening, the outer shell has a potting opening, and the opening and the potting opening correspond to the potting space.

In some embodiments, the electrical receptacle connector further comprises a sealing body, the sealing body is in the potting space to fill the hollow portion, and the sealing body encloses the body portions at the hollow portion.

In some embodiments, the base portion has an inclined portion, and the potting opening corresponds to the inclined portion.

In some embodiments, the inclined portion is on the base portion and faces the tongue portion.

In some embodiments, waterproof glues are poured into the hollow portion from the potting opening and the opening, parts of the waterproof glues flow into the hollow portion along the inclined portion, rest parts of the waterproof glues directly flow into the hollow portion, the waterproof glues are in the potting space to fill the hollow portion, the waterproof glues are dried to form a sealing body, the sealing member is in the potting space to fill the hollow portion, and the sealing body encloses the body portions at the hollow portion.

In some embodiments, the potting opening is a notch formed at a top surface of the outer shell and the notch is a large cutout from a rear edge of the outer shell.

In some embodiments, the opening is a notch formed at a top surface of the inner shell, and the notch is a cutout from a rear edge of the inner shell.

In some embodiments, a width of the cutout at the inner shell is greater than a width of the cutout at the outer shell.

In some embodiments, a depth of the cutout at the inner shell is less than a depth of the cutout at the outer shell.

In some embodiments, a combination of the opening of the inner shell, the potting opening of the outer shell, and the insulated housing form an injection opening in communication with the potting space.

Based on the above, according to one or some embodiments of the instant disclosure, the insulated housing has the hollow portion between the base portion and the tongue portion, and the body portions of the receptacle terminals are exposed from the hollow portion. Moreover, the metallic shell outside the insulated housing has the potting opening, the metallic shell covers the hollow portion to form a potting space, the potting opening corresponds to the potting opening and the sealing body is filled in the potting space from the potting opening. Therefore, the sealing body is provided between the base portion and the tongue portion and is sealed between the insulated housing and the receptacle terminals. Hence, the waterproof function of the electrical receptacle connector can be achieved.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
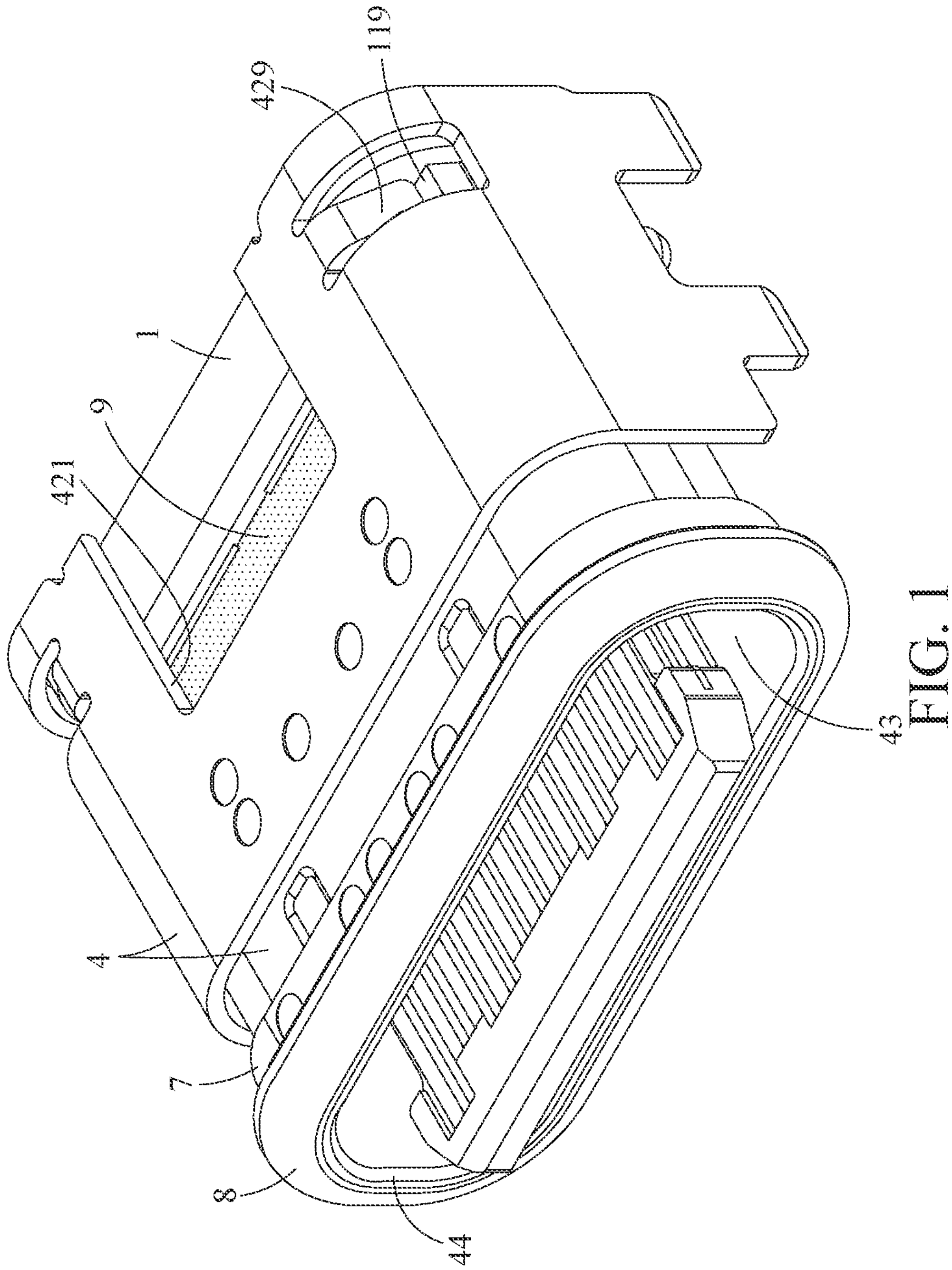
FIG. 1 illustrates a perspective view of an electrical receptacle connector according to some embodiments of the instant disclosure, where the sealing body is exposed from the potting opening of the metallic shell.
Figure 2:
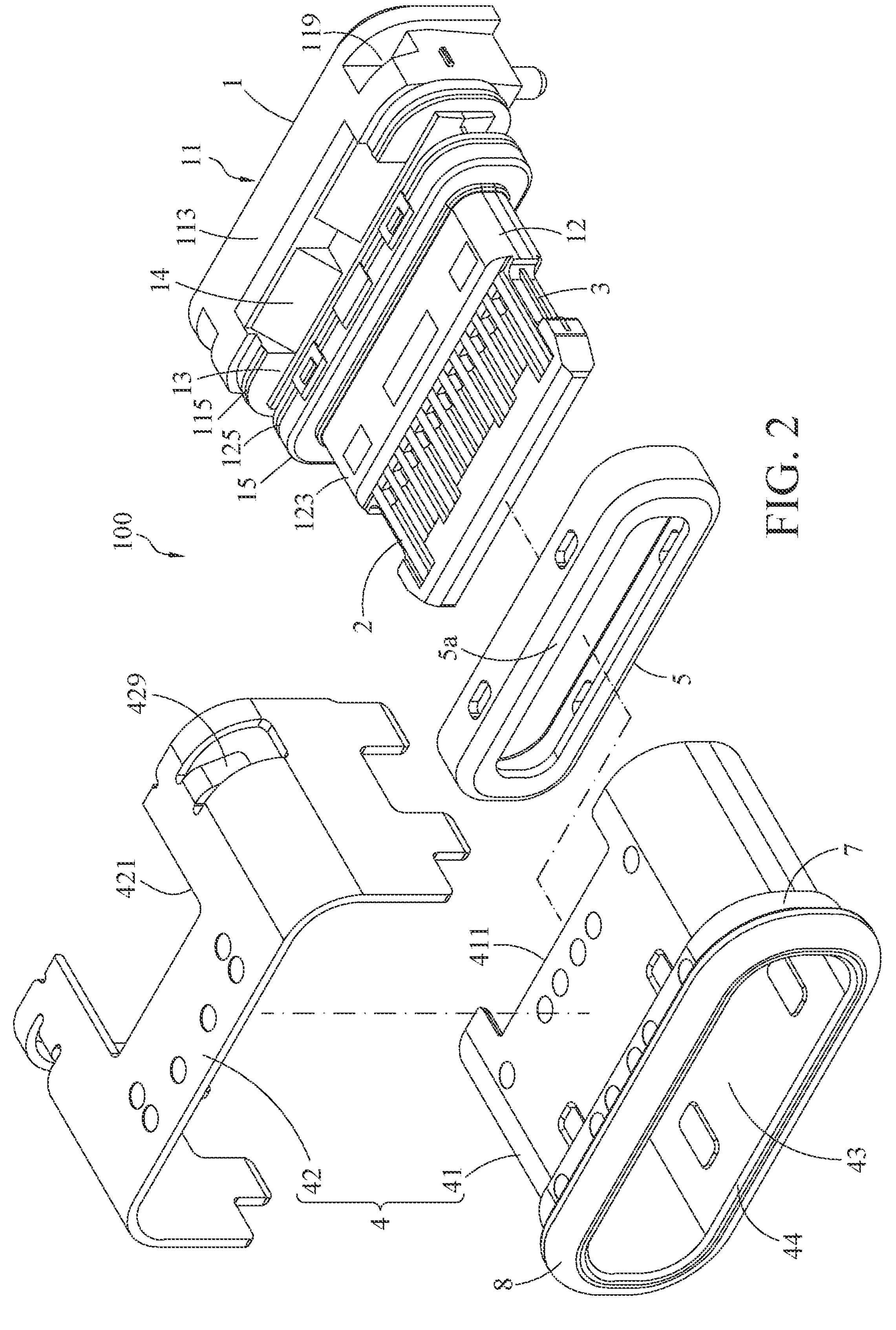
FIG. 2 illustrates an exploded view of the electrical receptacle connector according to some embodiments of the instant disclosure, where the sealing body is not shown.
Figure 3:
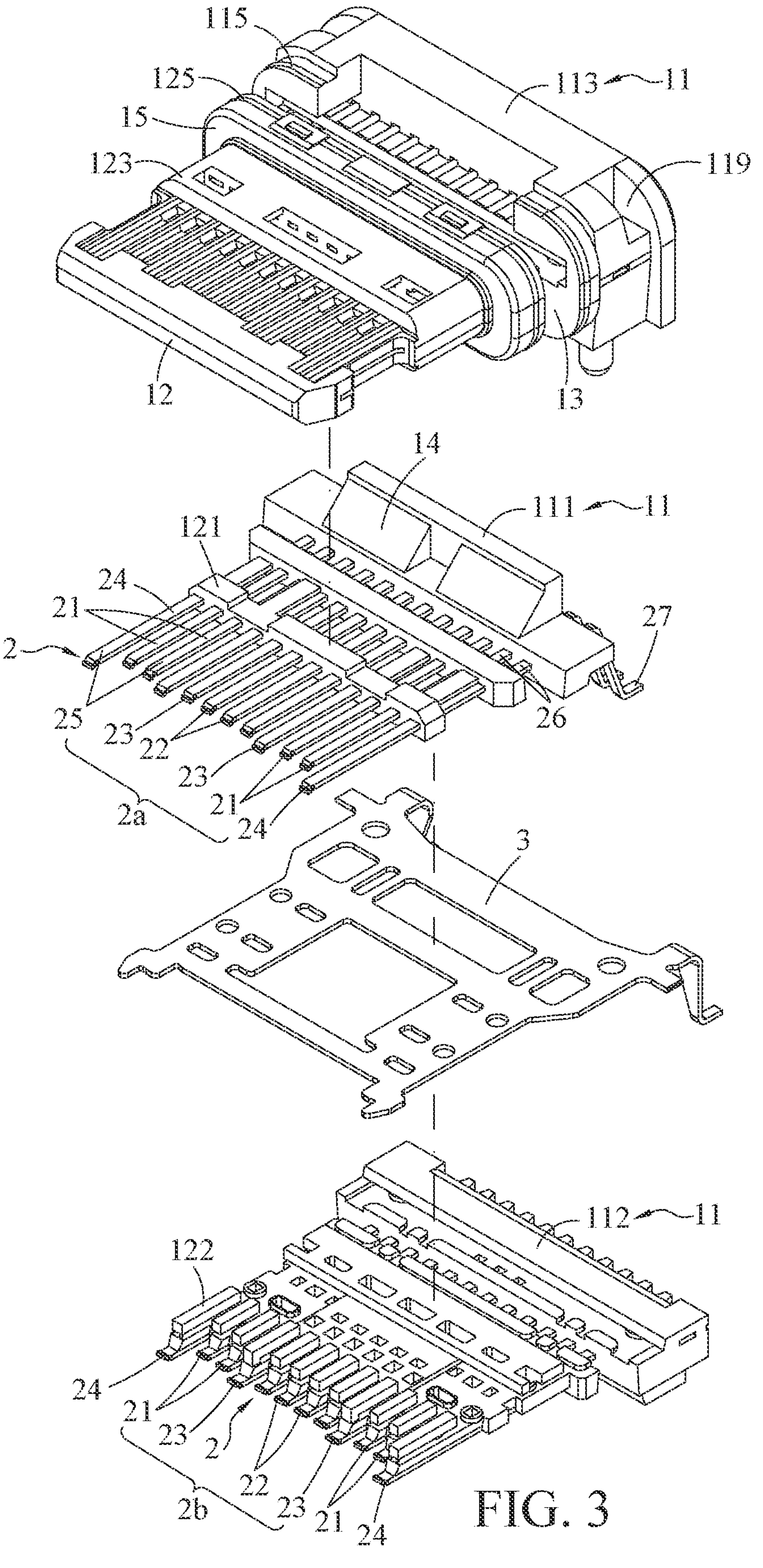
FIG. 3 illustrates an exploded view of the receptacle terminals, the grounding sheet, and the three-piece housing of the electrical receptacle connector according to some embodiments of the instant disclosure.

Please refer to FIG. 1 to FIG. 3. FIG. 1 illustrates a perspective view of an electrical receptacle connector 100 according to some embodiments of the instant disclosure. FIG. 2 illustrates an exploded view of the electrical receptacle connector 100 according to some embodiments of the instant disclosure. FIG. 3 illustrates an exploded view of the receptacle terminals 2, the grounding sheet 3, and the three-piece housing of the electrical receptacle connector 100 according to some embodiments of the instant disclosure. In some embodiments, the electrical receptacle connector 100 is in accordance with the specification of USB type-C connection interfaces, but embodiments are not limited thereto. In some embodiments, the electrical receptacle connector 100 may be in accordance with the specification of HDMI connection interfaces. In this embodiment, the electrical receptacle connector 100 comprises an insulated housing 1, a plurality of receptacle terminal 2, and a metallic shell 4.

The insulated housing 1 comprises a base portion 11, a tongue portion 12, and a hollow portion 13, the tongue portion 12 is at a front end of insulated housing 1, the base portion 11 is at a rear end of insulated housing 1, and the hollow portion 13 is between the base portion 11 and the tongue portion 12.

The receptacle terminals 2 are held at the base portion 11 and the tongue portion 12. Each of the receptacle terminals 2 comprises a contact portion 25, a body portion 26, and a tail portion 27. Each of the contact portions 25 extends from one of two ends of a corresponding one of the body portions 26, and the contact portions 25 are at the two faces (the upper face and the lower face) of the tongue portion 12. Each of the tail portions 27 extends from the other end of the corresponding one of the body portions 26 and protrudes out of the other end of the base portion 11. The body portions 26 penetrate through the base portion 11 and the tongue portion 12 and are exposed from the hollow portion 13.

Figure 8:
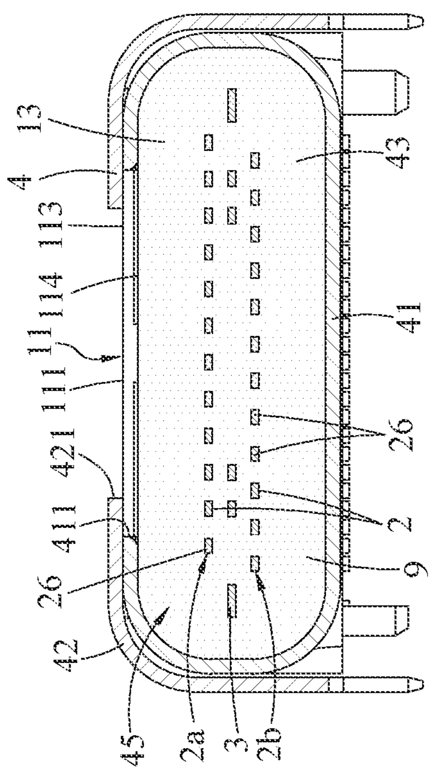
FIG. 8 illustrates a schematic cross-sectional view along the line A-A shown in FIG. 6, showing that the sealing body is filled into the potting space.
Figure 7:
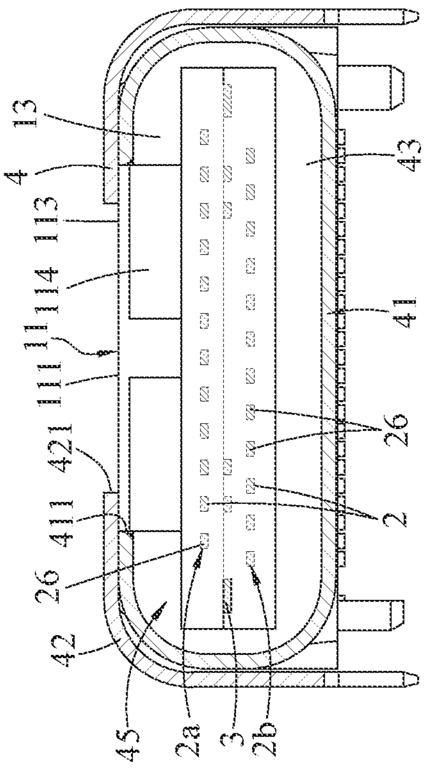
FIG. 7 illustrates a schematic cross-sectional view along the line A-A shown in FIG. 5, indicating that the sealing body is not filled into the potting space.
Figure 9:
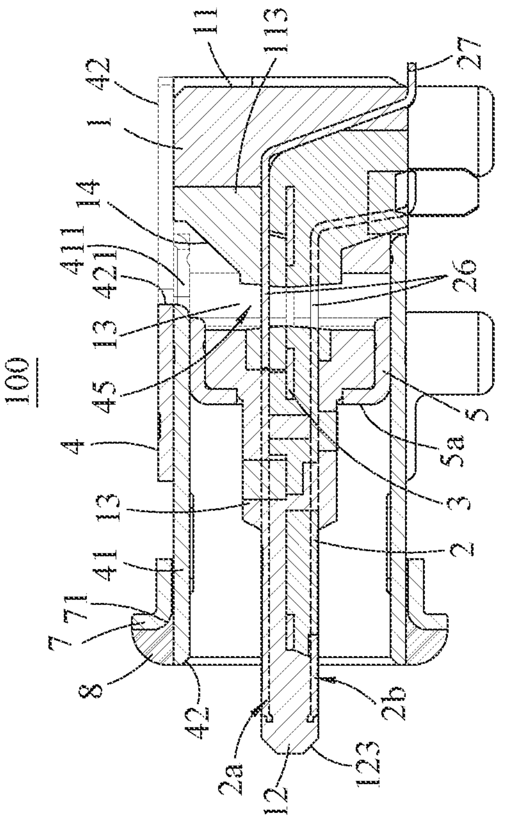
FIG. 9 illustrates a schematic cross-sectional view along the line B-B shown in FIG. 5, indicating that the sealing body is not filled into the potting space.

The metallic shell 4 comprises a receiving cavity 43 and an insertion opening 44 in communication with the receiving cavity 43. The insulated housing 1 is in the receiving cavity 43, the metallic shell 4 covers the hollow portion 13 to form a potting space 45 at the hollow portion 13 (as shown in FIG. 7 to FIG. 9). The metallic shell 4 has a potting opening 421, and the potting opening 421 corresponds to the potting space 45. The potting opening 421 is a notch formed at a top surface of the metallic shell 4.

When the metallic shell 4 is assembled outside the insulated housing 1, the potting opening 421 of the metallic shell 4 corresponds to the hollow portion 13. Hence, after the electrical receptacle connector 100 is placed horizontally, glue can be applied to the hollow portion 13 between the base portion 11 and the tongue portion 12 conveniently.

In some embodiments, the electrical receptacle connector 100 further comprises a sealing body 9 (for the sake of clearly showing the position at which the sealing body 9 is, in FIG. 1, FIG. 6, FIG. 8, and FIG. 10, the sealing body 9 is indicated by dotted regions; the actual product does not have the dotted regions). The sealing body 9 in liquid state can be filled in potting space 45 from the potting opening 421, and the sealing body 9 in liquid state is dried to form the sealing bod 91 (which is a glue block). The sealing body 9 is provided at the gap between the body portions 26 and the insulated housing 1 and at the gap between the metallic shell 4 and the base portion 11. In this embodiment, the sealing body 9 is in the potting space 45, covered by the metallic shell 4, merely exposed from the potting opening 421, and not exposed from side surfaces of the potting space 45. Therefore, from a rear view of the electrical receptacle connector 100, the sealing body 9 is not shown and shielded by the base portion 11.

In some embodiments, the insulated housing 1 has a plurality of terminal grooves, and the receptacle terminals 2 are at the terminal grooves and penetrate the base portion 11 and the tongue portion 12; however, embodiments are not limited thereto. In some embodiments, the insulated housing 1 and the receptacle terminals 2 are integrally formed as a unitary member so as to be applied to a waterproof electrical receptacle connector 100. It should be noted that, the insert-molding technique, the over-molding technique, combinations of the two molding techniques, or other molding techniques are all within the scope of the term "integrally formed". In some embodiments where the insulated housing 1 is devoid the terminal grooves, the receptacle terminals 2 directly penetrate the base portion 11 and the tongue portion 12. In the waterproof electrical receptacle connector 100, the receptacle terminals 2 are made of metal and the insulated housing 1 is made of plastic, and these two materials have different thermal expansion coefficient. Hence, during processing the electrical receptacle connector 100, in the step of passing through the convection oven, gaps will be generated between the receptacle terminals 2 and the insulated housing 1. As a result, the electrical receptacle connector 100 cannot provide a proper waterproof function without the sealing body 9. Accordingly, the sealing body 9 mentioned in the foregoing embodiments is also applied to the electrical receptacle connector 100 having the insulated housing 1 integrally formed with the receptacle terminals 2, so that the sealing body 9 can be formed in the potting space 45 and fill into the gaps between the components of the connector.

Figure 4:
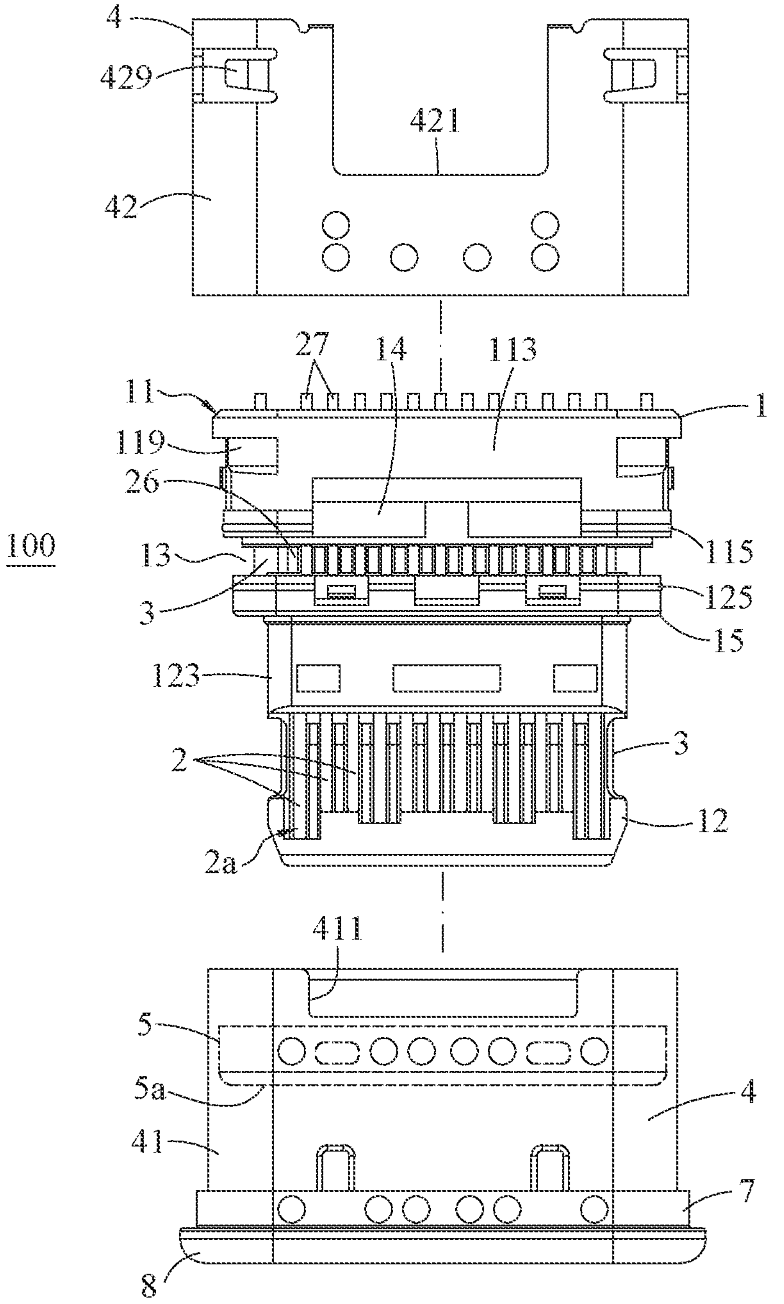
FIG. 4 illustrates a top exploded view of the electrical receptacle connector according to some embodiments of the instant disclosure, where sealing body is not shown.
Figure 5:
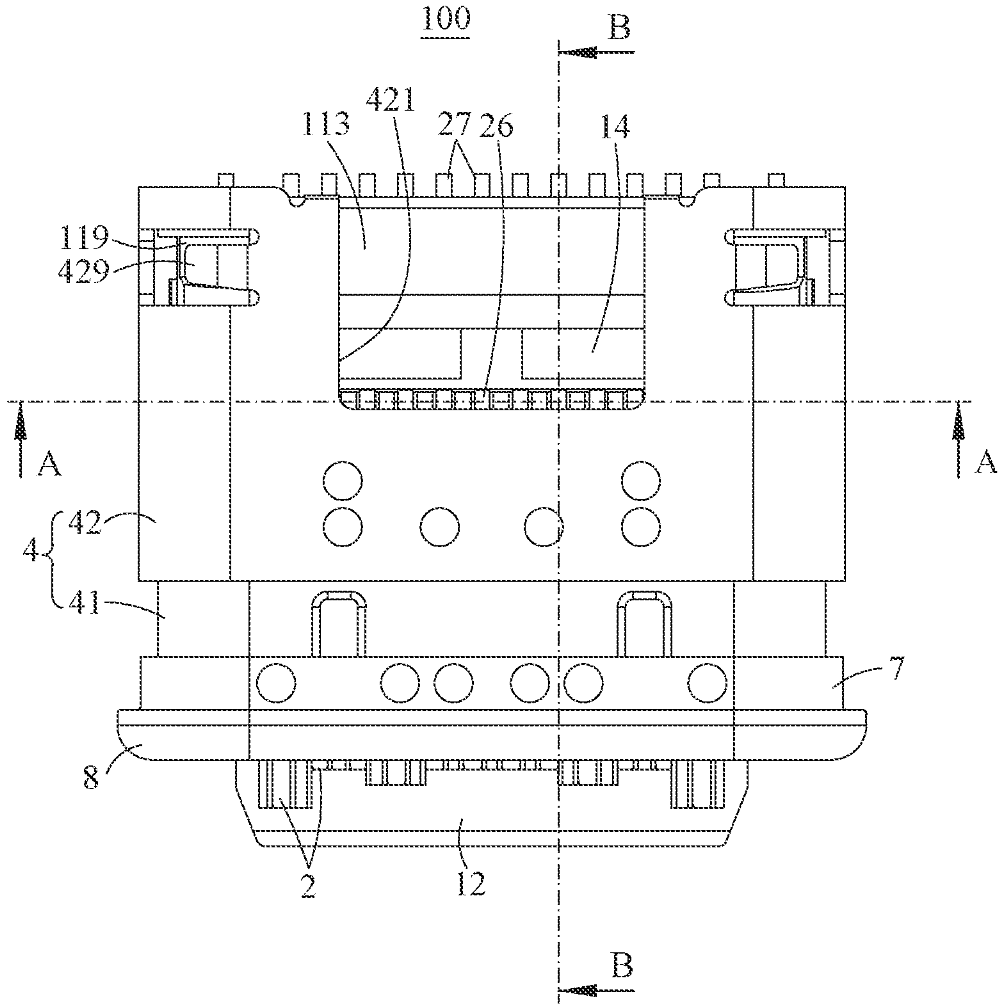
FIG. 5 illustrates a top view of the electrical receptacle connector according to some embodiments of the instant disclosure, where sealing body is not shown.

Please refer to FIG. 4 and FIG. 5. FIG. 4 illustrates a top exploded view of the electrical receptacle connector 100 according to some embodiments of the instant disclosure. FIG. 5 illustrates a top view of the electrical receptacle connector 100 according to some embodiments of the instant disclosure. In some embodiments, the metallic shell 4 comprises an inner shell 41 and an outer shell 42 combined with the inner shell 41, the outer shell 42 is an inverse U-shaped structure, and the inner shell 41 is a hollow rectangular structure. The inner shell 41 and the outer shell 42 are combined with each other through laser soldering techniques. The outer shell 42 has the potting opening 421, the inner shell 41 has an opening 411, and the opening 411 corresponds to the potting opening 421. The opening 411 is a notch formed at a top surface of the inner shell 41 and the notch is a cutout from a rear edge of the inner shell 41. The potting opening 421 is a notch formed at a top surface of the outer shell 42 and the notch is a large cutout from a rear edge of the outer shell 42. During the glue potting process, sealing body 9 can be filled into the potting space 45 from the potting opening 421 and the opening 411.

Please refer to FIG. 4 and FIG. 5. A buckling portion 119 is on each of two sides of the base portion 11, and an engaging portion 429 is on each of two sides of the outer shell 42, and each of the engaging portions 429 is engaged with a corresponding one of the engaging portions 119. After the outer shell 42 covers the inner shell 41, the engaging portions 429 of the outer shell 42 are positioned with the buckling portions 119 of the base portion 11, and the outer shell 42 is welded with the inner shell 41 through several welding spots, so that the combination strength between the insulated housing 1 and the metallic shell 4 can be increased.

Please refer to FIG. 4 and FIG. 5. FIG. 4 illustrates a top exploded view of the electrical receptacle connector 100 according to some embodiments of the instant disclosure. FIG. 5 illustrates a top view of the electrical receptacle connector 100 according to some embodiments of the instant disclosure. In some embodiments, the base portion 11 has an inclined portion 15, and the potting opening 421 corresponds to the inclined portion 15. The inclined portion 15 is on the base portion 11 and faces the tongue portion 12. The inclined portion 15 allows the hollow portion 13 to have a wide opening, and the width of the opening of the hollow portion 13 is gradually reduced along an outside-in direction, thus facilitating the sealing body 9 in liquid state to flow into the hollow portion 13 conveniently.

Please refer to FIG. 5. In some embodiments, from a top view of the potting opening 421, a portion of the potting opening 421 corresponds to the inclined portion 14, and the other portion of the potting opening 421 corresponds to the hollow portion 13. When the sealing body 9 in liquid state is poured into the hollow portion 13 from the potting opening 421, parts of the sealing body 9 may flow into the hollow portion 113 along the inclined portion 14, while rest parts of the sealing body 9 may directly flow into the hollow portion 13.

Please refer to FIG. 3. In some embodiments, the receptacle terminals 2 comprise a first row of terminals 2*a* and a second row of terminals 2*b* arranged into two rows. The tongue portion 12 and the base portion 11 are separated components. The tongue portion 12 has a first tongue housing 121 combined with the first row of terminals 2*a*, a second tongue housing 122 combined with the second row of terminals 2*b*, and a third tongue housing 123 combined with the first tongue housing 121 and the second tongue housing 122. The base portion 11 has a first base housing combined 111 with the first row of terminals 2*a*, a second base housing 112 combined with the second row of terminals 2*b*, and a third base housing 113 combined with the first base housing 111 and the second base housing 112.

Please refer to FIG. 3. In some embodiments, the first tongue housing 121 and the first base housing 111 are together defined as a first piece housing, and the first tongue housing 121 and the first base housing 111 are combined with the first row of terminals 2*a* by a processing procedure to form a first terminal module; the second tongue housing 122 and the second base housing 112 are together defined as a second piece housing, and the second tongue housing 122 and the second base housing 112 are combined with the second row of terminals 2*b* by a processing procedure to form a second terminal module; the third tongue housing 123 and the third base housing 113 are together defined as a third piece housing, and the first terminal module and the second terminal module are assembled with the third tongue housing 123 and the third base housing 113 by a processing procedure.

Please refer to FIG. 2, FIG. 4, and FIG. 8. In some embodiments, the base portion 11 and the tongue portion 12 are separated plastic components. The base portion 11 and the tongue portion 12 are connected with each other through the body portions 26 of the receptacle terminals 2. The body portions 26 are at the hollow portion 13 and exposed from the hollow portion 13.

Please refer to FIG. 3. In some embodiments, the upper row of the receptacle terminals 2 (the first row of terminals 2*a*) are insert-molded with the first base housing 111 and the first tongue housing 121, and the lower row of the receptacle terminals 2 (the second row of terminals 2*b*) are insert-molded with the second base housing 112 and the second tongue housing 122. Next, the third base housing 113 is formed outside the first base housing 111 and the second base housing 112, and the third tongue housing 1123 is formed outside the first tongue housing 121 and the second tongue housing 122. Therefore, the insulated housing can be provided.

Please refer to FIG. 3. In some embodiments, the third tongue housing 123 has a tongue annular protruding portion 125, and the tongue annular protruding portion 125 is a protruding rib structure; the third base housing 113 has a base annular protruding portion 115, and the base annular protruding portion 115 is a protruding rib structure. The base annular protruding portion 115 contacts an inner wall of the inner shell 41, and the base annular protruding portion 115 is closely attached to the inner wall of the inner shell 41. The potting space 45 is between the tongue annular protruding portion 125 and the base annular protruding portion 115, the tongue portion 12 has a stepped portion 15 adjacent to the base portion 11, and the tongue annular protruding portion 125 is at the stepped portion 15.

Please refer to FIG. 3. In some embodiments, the electrical receptacle connector 100 further comprises a blocking member 5 fitted over the third tongue housing 123, the tongue annular protruding portion 125 contacts an inner wall of the blocking member 5, an outer wall of the blocking member 5 contacts the inner wall of the inner shell 41, and a side surface of the blocking member 5 is in the receiving cavity 43 and faces the insertion opening 44. The blocking member 5 is combined in the inner shell 41, and the blocking member 5 is combined with the inner shell 41 through laser soldering techniques. When an electrical plug connector is inserted into the electrical receptacle connector 100, the front end of the electrical plug connector contacts the side surface 5*a* of the blocking member 5, so that the side surface 5*a* of the blocking member 5 prevents the electrical plug connector from colliding the insulated housing 1 so as to prevent the damage of the insulated housing 1.

Please refer to FIG. 3. In some embodiments, the electrical receptacle connector 100 further comprises a waterproof gasket 8 fitted over the metallic shell 4 and adjacent to the insertion opening 44.

Please refer to FIG. 3. In some embodiments, the electrical receptacle connector 100 further comprises a fixing member 7 combined with an outer portion of the metallic shell 4 and adjacent to the insertion opening 44. The fixing member 7 has a curved groove 71, and the waterproof gasket 8 is in the curved groove 71.

Please refer to FIG. 3. In some embodiments, the electrical receptacle connector 100 further comprises a grounding sheet 3. The grounding sheet 3 is at the insulated housing 1 and between the receptacle terminals 2 which arranged into two rows. The grounding sheet 3 and the lower row of receptacle terminals 2 (the second row of terminals 2*b*) are formed with the second tongue housing 122 and the second base housing 112.

Please refer to FIG. 3. In some embodiments, buckle structures are at the two sides of the grounding sheet 3 and protrude from two sides of the tongue portion 12. The buckle structures are provided for being contacted by the electrical plug connector. Therefore, when the electrical plug connector is mated with the electrical receptacle connector 100, the hooks at two sides of the electrical plug connector are buckled with the buckle structures of the electrical receptacle connector 100. Hence, the hooks at the two sides of the electrical plug connector can be prevented from wearing against the two sides of the tongue portion 12 to cause the wearing and damaging of the tongue portion 12. In some embodiments, the grounding sheet 3 is held at the tongue portion 12 to increase the structural strength of the tongue portion 12 and improve the shielding performance of the tongue portion 12. In some embodiments, when signals are transmitted between the terminals of the electrical plug connector and the receptacle terminals 2 of the electrical receptacle connector 100, the contact portions 25 of the receptacle terminals 2 of the electrical receptacle connector 100 can be isolated from each other by the grounding sheet 3 to reduce the crosstalk signal interferences upon signal transmission. Moreover, the grounding sheet 3 is at the tongue portion 12 to increase the structural strength of the tongue portion 12.

Figure 6:
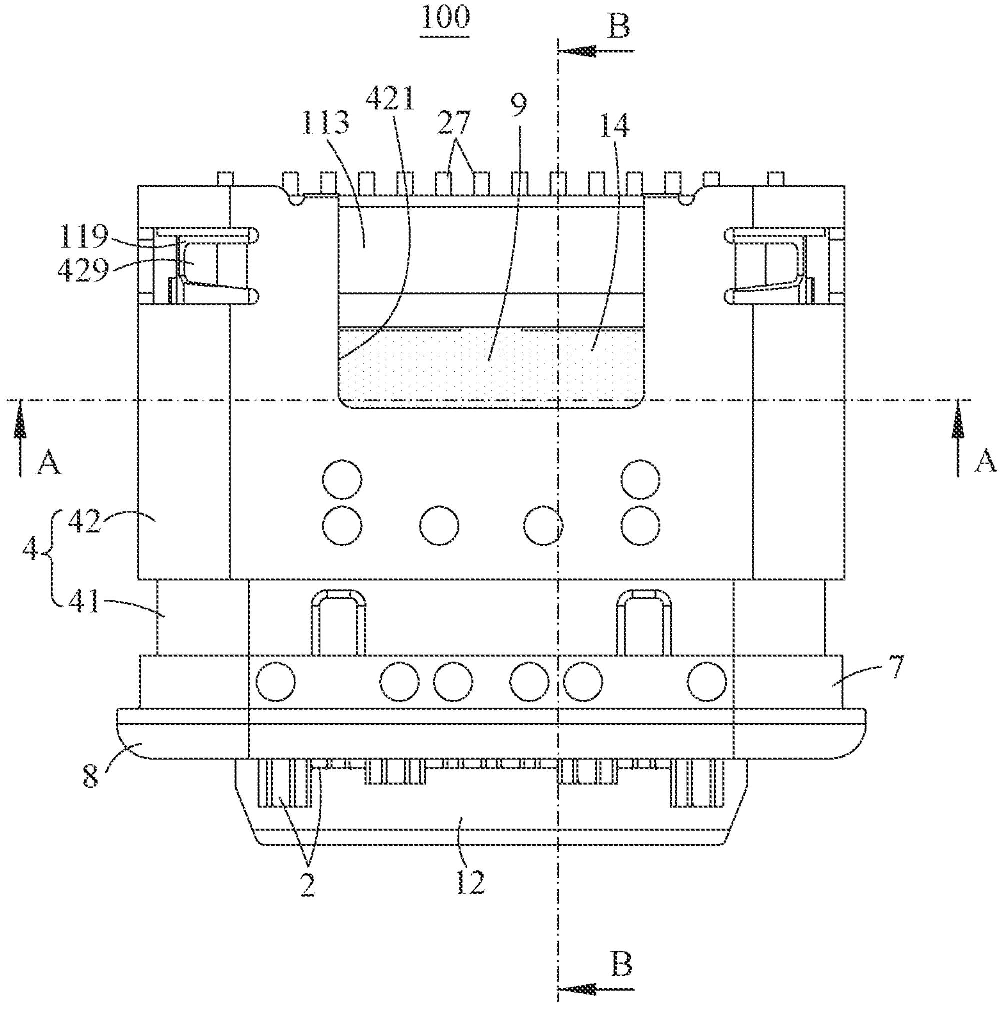
FIG. 6 illustrates a top view of the electrical receptacle connector according to some embodiments of the instant disclosure, where sealing body is shown.

Please refer to FIG. 3, FIG. 6, and FIG. 8. In some embodiments, the receptacle terminals 2 comprise a plurality of high-speed signal terminals 21, a plurality of low-speed signal terminals 22, a plurality of power terminals 23, and a plurality of ground terminals 24. The ground terminals 24 are at two outermost sides of the power terminals 23. The low-speed signal terminals 22 are between the power terminals 23. Each of the high-speed signal terminals 21 is between an adjacent one of the power terminals 23 and an adjacent one of the ground terminals 24.

Figure 10:
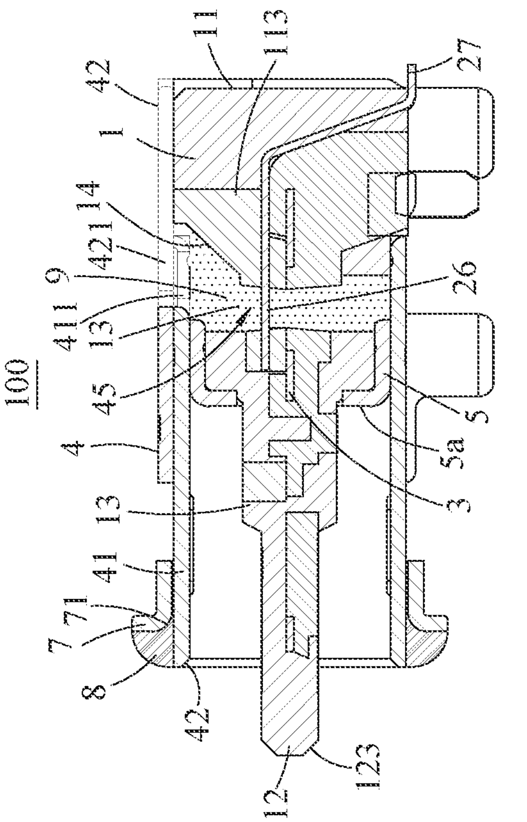
FIG. 10 illustrates a schematic cross-sectional view along the line B-B shown in FIG. 6, showing that the sealing body is filled into the potting space.

Please refer to FIG. 1 and FIG. 10. In some embodiments, the length of the metallic shell 4 is reduced to allow the exposure of the tongue portion 12, and the tongue portion 12 is exposed from the insertion opening 44 of the metallic shell 4.

Based on the above, according to one or some embodiments of the instant disclosure, the insulated housing has the hollow portion between the base portion and the tongue portion, and the body portions of the receptacle terminals are exposed from the hollow portion. Moreover, the metallic shell outside the insulated housing has the potting opening, the metallic shell covers the hollow portion to form a potting space, the potting opening corresponds to the potting opening and the sealing body is filled in the potting space from the potting opening. Therefore, the sealing body is provided between the base portion and the tongue portion and is sealed between the insulated housing and the receptacle terminals. Hence, the waterproof function of the electrical receptacle connector can be achieved.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electrical receptacle connector, comprising:

an insulated housing comprising a base portion, a tongue portion, and a hollow portion, wherein the tongue portion is at a front end of the insulated housing, the base portion is at a rear end of the insulated housing, and the hollow portion is between the base portion and the tongue portion;

a plurality of receptacle terminals held at the base portion and the tongue portion, wherein each of the receptacle terminals comprises a contact portion, a body portion, and a tail portion; each of the contact portions extends from one of two ends of a corresponding one of the body portions and the contact portions are on two faces of the tongue portion, each of the tail portions extends from the other end of the corresponding one of the body portions and protrudes out of the base portion, and the body portions penetrate through the base portion and the tongue portion and are partially exposed from the hollow portion; and a metallic shell having a receiving cavity and an insertion opening in communication with the receiving cavity, wherein the insulated housing is in the receiving cavity, the metallic shell covers the hollow portion to form a potting space at the hollow portion, and the metallic shell has a potting opening corresponding to the potting space.

2. The electrical receptacle connector according to claim 1, further comprising a sealing body, wherein the sealing member is in the potting space to fill the hollow portion, and the sealing body encloses the body portions at the hollow portion.

3. The electrical receptacle connector according to claim 2, wherein the metallic shell comprises an inner shell and an outer shell combined with the inner shell, a buckling portion is on each of two sides of the base portion, and an engaging portion is on each of two sides of the outer shell; each of the engaging portions is engaged with a corresponding one of the buckling portions, the outer shell has the potting opening, the inner shell has an opening, and the opening corresponds to the potting opening.

4. The electrical receptacle connector according to claim 3, wherein the receptacle terminals comprise a first row of terminals and a second row of terminals arranged into two rows; the tongue portion and the base portion are separated components; the tongue portion has a first tongue housing combined with the first row of terminals, a second tongue housing combined with the second row of terminals, and a third tongue housing combined with the first tongue housing and the second tongue housing; the base portion has a first base housing combined with the first row of terminals, a second base housing combined with the second row of terminals, and a third base housing combined with the first base housing and the second base housing.

5. The electrical receptacle connector according to claim 4, wherein the third tongue housing has a tongue annular protruding portion, the third base housing has a base annular protruding portion, the base annular protruding portion contacts an inner wall of the inner shell, and the potting space is between the tongue annular protruding portion and the base annular protruding portion; the tongue portion has a stepped portion adjacent to the base portion, and the tongue annular protruding portion is at the stepped portion.

6. The electrical receptacle connector according to claim 5, further comprising a blocking member, wherein the blocking member is fitted over the third tongue housing, the tongue annular protruding portion contacts an inner wall of the blocking member, an outer wall of the blocking member contacts the inner wall of the inner shell, and a side surface of the blocking member is in the receiving cavity and faces the insertion opening.

7. The electrical receptacle connector according to claim 4, wherein the first base housing has an inclined portion corresponding to the potting opening.

8. The electrical receptacle connector according to claim 3, further comprising a waterproof gasket, wherein the waterproof gasket is fitted over the metallic shell and adjacent to the insertion opening.

9. The electrical receptacle connector according to claim 8, further comprising a fixing member, wherein the fixing member is combined with an outer portion of the metallic shell and adjacent to the insertion opening, the fixing member has a curved groove, and the waterproof gasket is in the curved groove.

10. The electrical receptacle connector according to claim 4, further comprising a grounding sheet, wherein the grounding sheet is at the insulated housing and between the receptacle terminals which are arranged into the two rows.

11. An electrical receptacle connector, comprising:

an insulated housing comprising a base portion, a tongue portion, and a hollow portion, wherein the tongue portion is at a front end of the insulated housing, the base portion is at a rear end of the insulated housing, and the hollow portion is between the base portion and the tongue portion;

a plurality of receptacle terminals held at the base portion and the tongue portion, wherein each of the receptacle terminals comprises a contact portion, a body portion, and a tail portion; each of the contact portions extends from one of two ends of a corresponding one of the body portions and the contact portions are on two faces of the tongue portion, each of the tail portions extends from the other end of the corresponding one of the body portions and protrudes out of the base portion, and the body portions penetrate through the base portion and the tongue portion and are partially exposed from the hollow portion; and a metallic shell having a receiving cavity and an insertion opening in communication with the receiving cavity, wherein the insulated housing is in the receiving cavity, the metallic shell comprises an inner shell and an outer shell combined with the inner shell, the inner shell covers the hollow portion to form a potting space at the hollow portion, the inner shell has an opening, the outer shell has a potting opening, and the opening and the potting opening correspond to the potting space.

12. The electrical receptacle connector according to claim 11, further comprising a sealing body, wherein the sealing member is in the potting space to fill the hollow portion, and the sealing body encloses the body portions at the hollow portion.

13. The electrical receptacle connector according to claim 11, wherein the base portion has an inclined portion, and the potting opening corresponds to the inclined portion.

14. The electrical receptacle connector according to claim 13, the inclined portion is on the base portion and faces the tongue portion.

15. The electrical receptacle connector according to claim 13, wherein waterproof glues are poured into the hollow portion from the potting opening and the opening, parts of the waterproof glues flow into the hollow portion along the inclined portion, rest parts of the waterproof glues directly flow into the hollow portion, the waterproof glues are in the potting space to fill the hollow portion, the waterproof glues are dried to form a sealing body, the sealing member is in the potting space to fill the hollow portion, and the sealing body encloses the body portions at the hollow portion.

16. The electrical receptacle connector according to claim 11, wherein the potting opening is a notch formed at a top surface of the outer shell, and the notch is a large cutout from a rear edge of the outer shell.

17. The electrical receptacle connector according to claim 16, wherein the opening is a notch formed at a top surface of the inner shell, and the notch is a cutout from a rear edge of the inner shell.

18. The electrical receptacle connector according to claim 17, wherein a width of the cutout at the inner shell is greater than a width of the cutout at the outer shell.

19. The electrical receptacle connector according to claim 17, wherein a depth of the cutout at the inner shell is less than a depth of the cutout at the outer shell.

20. The electrical receptacle connector according to claim 11, wherein a combination of the opening of the inner shell, the potting opening of the outer shell, and the insulated housing form an injection opening in communication with the potting space.

* * * * *